(12) United States Patent
Olliges (10) Patent No.: US 8,064,183 B2
(45) Date of Patent: Nov. 22, 2011

(54) CAPACITOR BASED BI-DIRECTIONAL DEGAUSSING DEVICE WITH CHAMBER

(76) Inventor: William E. Olliges, Palm City, FL (US)

( * ) Notice: Subject to any disclaimer, the term of this patent is extended or adjusted under 35 U.S.C. 154(b) by 386 days.

(21) Appl. No.: 12/476,048

(22) Filed: Jun. 1, 2009

(65) Prior Publication Data

US 2010/0302701 A1 Dec. 2, 2010

(51) Int. Cl.
*H01H 47/00* (2006.01)
(52) U.S. Cl. ............................ 361/149; 361/143
(58) Field of Classification Search ................. 361/143, 361/149; 360/66
See application file for complete search history.

(56) References Cited

U.S. PATENT DOCUMENTS

| | | |
|---|---|---|
| 2,838,720 A | 6/1958 | Dostal |
| 2,962,560 A | 11/1960 | Folse |
| 3,321,586 A | 5/1967 | Krones |
| 4,157,581 A | 6/1979 | Keiichi et al. |
| 4,286,295 A | 8/1981 | Ipolyi |
| 4,423,460 A | 12/1983 | Jackson et al. |
| 4,547,727 A | 10/1985 | Tsui et al. |
| 4,551,782 A | 11/1985 | Seely et al. |
| 4,621,299 A | 11/1986 | Hill |
| 4,639,821 A | 1/1987 | Littwin et al. |
| 4,757,419 A | 7/1988 | Masaki |
| 5,132,860 A | 7/1992 | Von Stein |
| 5,198,959 A | 3/1993 | Scholtysik et al. |
| 5,666,413 A | 9/1997 | Kempf |
| 5,691,873 A | 11/1997 | Masaki |
| 5,721,665 A | 2/1998 | Schultz |
| 5,979,774 A | 11/1999 | Urushibata |
| 6,714,398 B2 | 3/2004 | Schultz |
| 7,324,321 B2 | 1/2008 | Olliges |
| 2007/0076326 A1* | 4/2007 | Ito ............................. 360/281.6 |

FOREIGN PATENT DOCUMENTS

| | | |
|---|---|---|
| EP | 1662487 | 5/2006 |
| EP | 1693833 | 8/2006 |
| EP | 1906388 | 4/2008 |
| JP | 2007026574 | 2/2007 |
| JP | 2009004067 | 1/2009 |

* cited by examiner

*Primary Examiner* — Danny Nguyen
(74) *Attorney, Agent, or Firm* — McHale & Slavin, P.A.

(57) ABSTRACT

Disclosed is an apparatus for destroying electronic memory media by use of a bi-directional degaussing device. The degaussing device utilizes an SCR gate controller to cause bi-directional polarity from a charged capacitor into a sealed chamber containing the magnetic media. The chamber has a movable steel plate cover and floor that encloses the chamber containing magnetic media during the degaussing stage. The cover and floor cause a reflective chamber that focuses and directs the flux level to the magnetic media. The gate controller allows the use of the same capacitor bank to power a coil in two different directions to obtain effective degaussing without multiple coils or directional capacitors.

10 Claims, 6 Drawing Sheets

CAPACITOR BASED BI-DIRECTIONAL DEGAUSSING DEVICE WITH CHAMBER

FIELD OF INVENTION

The invention relates to magnetic recording media erasers and, in particular, to a capacitor based bi-directional degaussing apparatus capable of erasing electronic memory media placed within a shielded chamber.

BACKGROUND OF THE INVENTION

Electronic storage of media is currently the preferred method of storing information. From non-essential phone numbers to top level government security information, magnetic media has been found to be secure as long as the magnetism of the storage medium is protected. For this reason the reliance upon magnetic storage mediums for storing all types of information is increasing exponentially. Should the storage medium be discarded, the ability for an unauthorized person to read such materials could be most damaging. Thus, the need to erase information from the storage medium has become of paramount importance.

While most computers could be repaired when they fail, technological advances and the low cost of replacement has made such repair uneconomical and most computers are simply discarded should a failure occur. During the discard process, the stored data is first transferred from the failed computer to the new computer. The hard drives of the discarded computer may be removed and the information stored thereon be erased. There are various devices employed to erase the information stored on hard drives but the most conventional is by degaussing to obtain reliable and complete erasure of the information contained on the hard drive.

Unfortunately, the finding of discarded electronic storage media still containing data is now common news. People believed the data had been deleted when a data storage device had been degaussed. Computers with information still in the memory have been sold or discarded. The high profile media coverage of some of these happenings and the potential liability and losses from such disclosures have made it more important than ever to provide extra security against such inadvertent loss of information.

While certain memory media may be easily destroyed, like optical memory, hard drives with rotating memory storage disks may be more difficult to degauss due to the housing structure. Hard disc drives typically include magnetic coatings rising past hard coercivities of 3000 Oersteds. The prior art systems using permanent magnets may not address the problems associated with degaussing of the newer type of hard drive components that are not readily accessible, due to such factors as the sealing of the hard drive disk and/or head within an enclosure having high coercivity magnetic media.

In order to properly erase U.S. Government classified magnetic media having a high coercivity magnetic media, erasure in as many spatial planes as possible is necessary. The applicant was granted U.S. Pat. No. 7,324,321 for a device capable of degaussing by use of a rotatable plate for rotating a hard disk between permanent magnets so as to expose the hard disk to various degrees of magnetism from various directions, the contents of which are incorporated by reference. A number of prior art devices that employ magnets for degaussing are embodied in patents such as U.S. Pat. Nos. 4,157,581; 4,286,295; 4,423,460; 4,551,782; 4,639,821; 4,757,419; 5,132,860; 5,666,413; 5,721,665; 5,979,774; and 6,714,398.

In many instances the act of degaussing must address the more difficult to reach hard disc media and/or remove signal data plus any residual magnetic noise if the disc is to be reused. The use of a capacitive discharge has been found to reach the more difficult hard disc drives and address extraneous or structurally generated magnetic noise pulses that might remain in the magnetic coating. The use of a capacitor discharge for degaussing is known in the prior art, see U.S. Pat. Nos. 2,838,720; 2,962,560; and 3,321,586 as illustrative examples.

Current teachings in this area have further found that the reversing of polarity improve the degaussing technique. U.S. Pat. No. 4,621,299 discloses a coil of wire having a substantially rectangular cross section in which a magnetic tape is inserted. A capacitor is charged and repeatedly discharged through the coil. A second capacitor is provided across which a control voltage develops. The voltage across the second capacitor is compared with the voltage across the storage capacitor. When the storage capacitor has charged to a level related to the control voltage, the storage capacitor is discharged at the same time the tape is rotated to reverse the field direction and ensure uniform degaussing.

U.S. Pat. No. 4,757,419 discloses an apparatus for generating pulse line of magnetic force using a diode in parallel with a first capacitor and a diode connected in parallel with a second capacitor, the capacitors have opposite polarity wherein the peak charge current required for the first capacitor can be reduced, and the capacitor discharge in opposite polarity.

U.S. Pat. No. 5,198,959 discloses a device for de-magnetizing magnetic recording tape. This device employs a cylindrical coil which is provided with exciting windings, the filed distribution of which extends essentially parallel to the winding plane of the recording medium.

U.S. Pat. No. 5,691,873 discloses a device for generating high-power magnetic pulses at shortened pulse intervals using multiple thyristors and a pair of coil members disposed to generate opposing magnetic fields when energized.

Thus, what is lacking in the art is a degaussing apparatus capable of housing a magnetic disc for subject to a capacitor based bi-directional degaussing current, the housing acting as a reflective chamber and allowing a pass through of the storage medium.

SUMMARY OF INVENTION

Disclosed is a degaussing apparatus employed to erase information contained on magnetic recording or storage media. The degaussing apparatus utilizes an SCR gate controller to cause bi-directional polarity from a charged capacitor into a sealed chamber. The chamber having a movable cover and movable floor support that seal the chamber containing magnetic media during the degaussing stage. The cover and floor are steel plates creating a ferrous element that retains and directs the current discharge to the magnetic media.

An objective of the invention is to provide a nearly silent degaussing apparatus capable of irrevocably rendering information stored on magnetic memory inaccessible.

The device includes a chamber and the use of chamber enclosure covers that focus the magnetic flux and further reduce and/or eliminate magnetic field leakage.

Another objective of the invention is to provide an apparatus capable of deep level degaussing reduction of media noise.

Still another objective of the invention is to provide a near constant current charge circuit to provide a near constant current charge with a minimum charge time.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 11 is a schematic of the charging circuit.
In the drawings, GRD means ground; C-Capacitor; D-Diode; U1-SCR Gate Control, L1-Coil.

DETAILED DESCRIPTION OF THE INVENTION

While the present invention is susceptible of embodiment in various forms, there is shown in the drawings and will hereinafter be described the presently preferred embodiment with the understanding that the present disclosure is to be considered an exemplification of the invention and is not intended to limit the invention to the specific embodiments illustrated.

Figure 1:
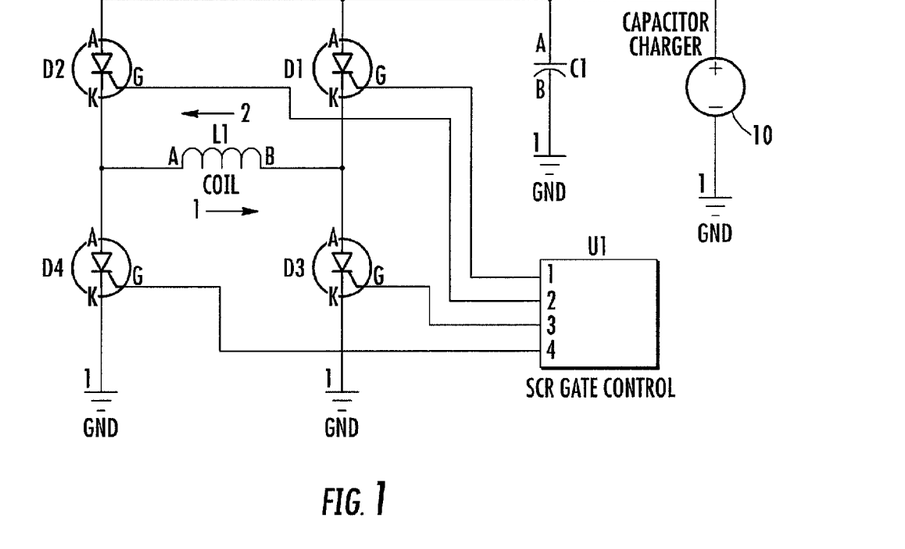
FIG. 1 is an electrical schematic of the preferred embodiment.
Figure 2:
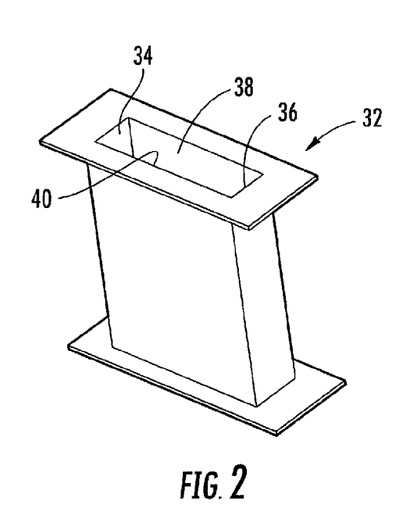
FIG. 2 is a perspective view of a bobbin.
Figure 3:
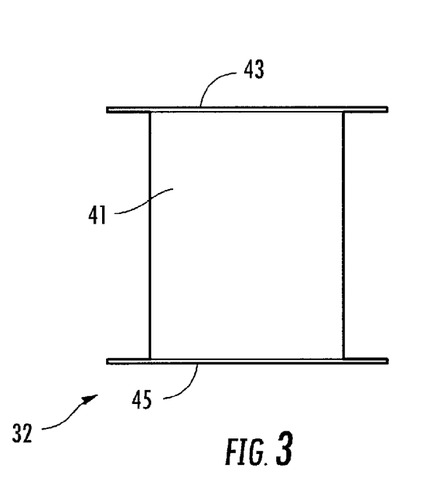
FIG. 3 is a front plane view of FIG. 2.
Figure 11:
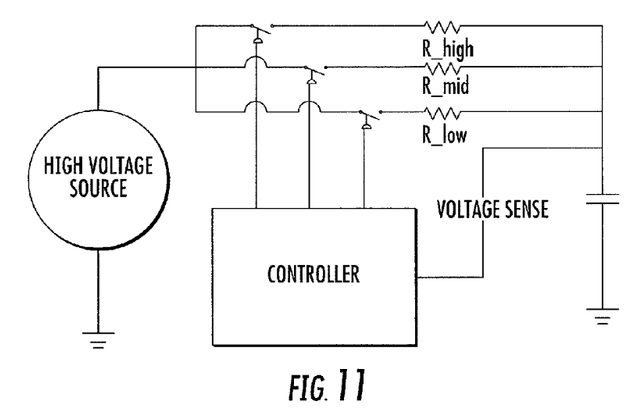

Now referring to FIG. 1, set forth is a control circuit of the preferred invention. A control circuit has a capacitor charger 10 for reduction of power, preferably 120 VAC to DC, the charge capable of providing a charge to a capacitor bank C1 of about 400 VDC. Operation of the capacitor is controlled by SCR thyristor gate controller U1. Upon the capacitor bank C1 being fully charged, SCR'z Diode 2 and Diode 3 are fired by the gate controller U1. The firing of the gate controller causes capacitor bank C1 to discharge through coil L1 with the polarity flowing in the direction from A to B as shown by the numeral 1. In operation, the capacitor charger 10 recharges capacitor C1 to a full voltage wherein SCR gate controller U1 operates Diode D1 and D4 causing capacitor bank C1 to discharge through coil L1, with a current flowing through L1 from B to A providing the bi-directional degaussing. The bi-directional flow allows for an increase in the flux field differential experienced by the magnetic media being degaussed, with the SCR Bridge being used to generate the bi-directional degaussing current in the coil. Using the SCR bridge in this fashion enables the degaussing coil to sequentially generate a full strength flux field in opposite directions, thereby increasing the net flux field differential by a factor of two when compared with a system using a standard mono directional degaussing current.

Referring now to the figures in general, the degaussing frame consists of a bobbin 32 having a front wall 34, a back wall 36 and opposing sidewalls 38 and 40. The bobbin defines an interior chamber 42 having an exterior continuous sidewall 41 with a top opening 43 and lower opening 45. While the size of the interior chamber 42 may be altered, the illustrated chamber is about 4.5 inches long, 1.2 inches wide and 7 inches deep. This size chamber handles the conventional large hard drive that is 4 inches long, 1 inch wide and 6 inches deep.

Figure 4:
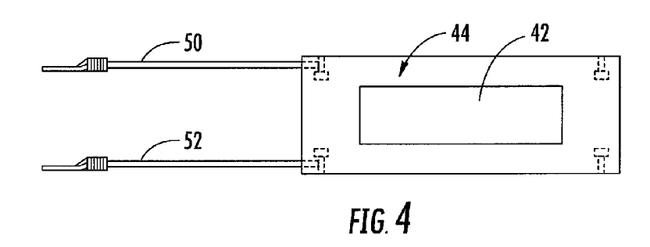
FIG. 4 is a top view of the bobbin having an outer shield housing a coil.
Figure 5:
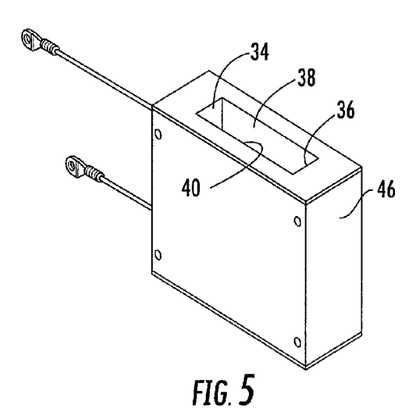
FIG. 5 is a perspective view of FIG. 4.

A coil 44 capable of generating magnetic forces greater than 2000 A is positioned around the exterior 41 of the bobbin 32 and shielded by cover panels 46 to cause magnetic forces induced by the coil to be directed into the interior chamber 42. The coil 44 is wrapped around the bobbin with leads 50 and 52 for receipt of the capacitor discharge and reversing of polarity. The coil may be sized for the storage medium, or oversized to accommodate most all instances. For instance, NSA requires degaussing at three times the coercivity. If the coercivity is 750 Oersteds, the coil is sized to produce at least three times that level.

Figure 6:
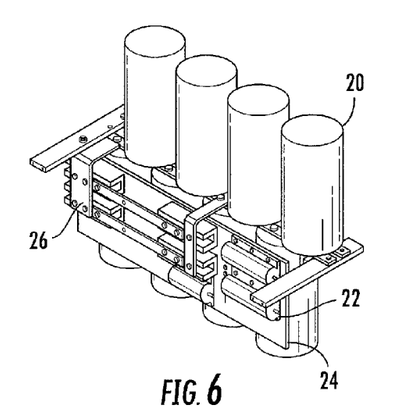
FIG. 6 is an illustration of the positioning of the capacitors and gate controller on a support assembly.

The coil driver assembly consists of eight 12000 uF-400 v capacitors 20 mounted to a support assembly 24. The capacitors are electrically coupled using copper electrical connector strips 26 for purposes of simultaneous discharge when fired. The SCR gate controller U1 (22) is attached to the support board 24 and electrically connected to the diodes. The charger 30 is used to convert 120 VAC to low voltage DC for charging the capacitor bank. The preferred charge is a constant current charging circuit, the current lessens during charging to protect the capacitor bank. The charger is based upon a source voltage of a known constant, the capacitor voltage is measured by a controller wherein resistor switches are sequenced by the controller such that the charging current is as close to the maximum allowed current. This facilitates a near constant current charge and a minimum charge time. Once the desired capacitor voltage is reached all resistors are turned off.

Figure 7:
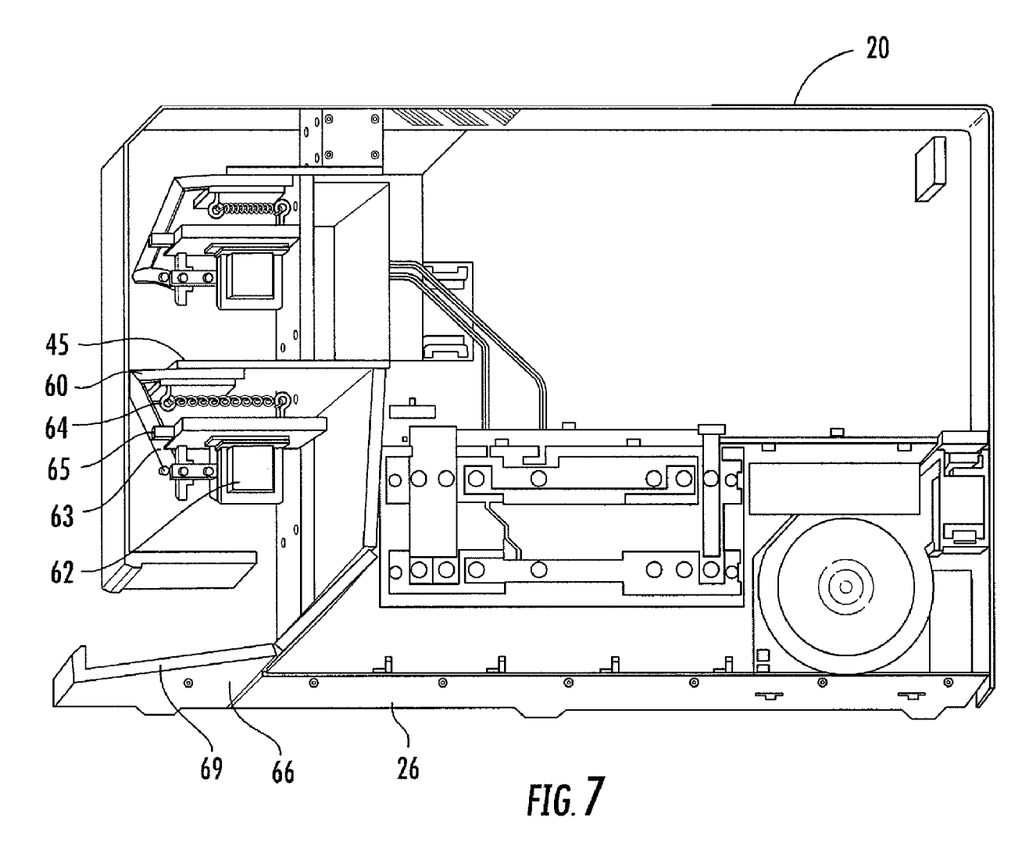
FIG. 7 is a cross sectional side view of the degaussing device illustrating the chamber in a sealed position.
Figure 8:
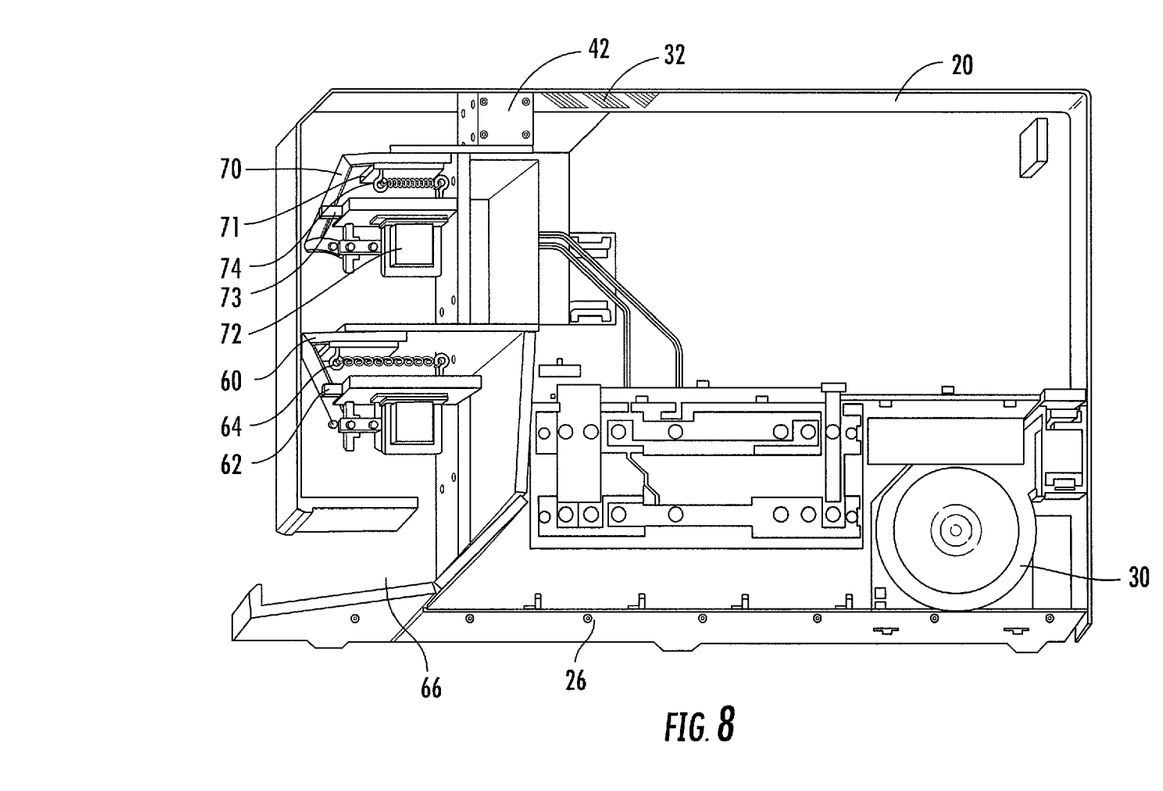
FIG. 8 is a cross sectional side view of the degaussing device illustrating the chamber with a floor panel in a retracted position.

Preferred resistor sequencing is as follow:

| R_high | R_mid | R_low | |
|--------|-------|-------|---|
| 1 | 0 | 0 | ↓ |
| 0 | 1 | 0 | ↓ |
| 1 | 1 | 0 | ↓ |
| 0 | 0 | 1 | Increasing capacitor voltage |
| 1 | 0 | 1 | ↓ |
| 0 | 1 | 1 | ↓ |
| 1 | 1 | 1 | ↓ |

Where the resistance of R-high > R_mid > R_low
Typically R_mid = 2 * R_low and R_high = 4 * R_low Referring to FIG. 7, a movable floor 60 is positioned beneath the bottom opening of the chamber and is used to support magnetic storage medium placed within the chamber. The movable floor 60 is operated by a spring loaded solenoid 62 that, when energized, permits the movable floor to slide beneath the chamber sealing the bottom of the chamber and supporting the magnetic media place therein. It is noted that in the preferred embodiment the chamber is shown in a position that the floor operates as a discharge chute that upon removal of power to the solenoid a spring 64 causes the floor to retract, as shown in FIG. 8, and magnetic media placed within the chamber 42 is directed to the chute 66 for ease of retrieving the degaussed media storage medium which is deposited into tray 69. It should be noted that this chute may also be directed to a crusher or shredder if the magnetic media is to be physically destroyed. The solenoid employs a linkage arm 63 that coupled to the solenoid actuator and the floor plate, the linkage arm having a pivot point mount 65 which further acts as one end of the spring support.

A movable cover 70 is positionable over the chamber 42 and, similar to the floor panel, movable cover 70 is coupled to a solenoid 72 by mechanical linkage 71 associated with pivot point mount 73 so as to cause the cover to be placed in an open position when the solenoid is activated thereby allowing access to the chamber for placement of a magnetic media therein. Spring 74 is under extension when the cover is opened so as to allow the cover and floor to be in a normally closed position when the solenoid are not actuated and the springs are allowed to close the cover and floor thereby sealing the chamber.

Figure 9:
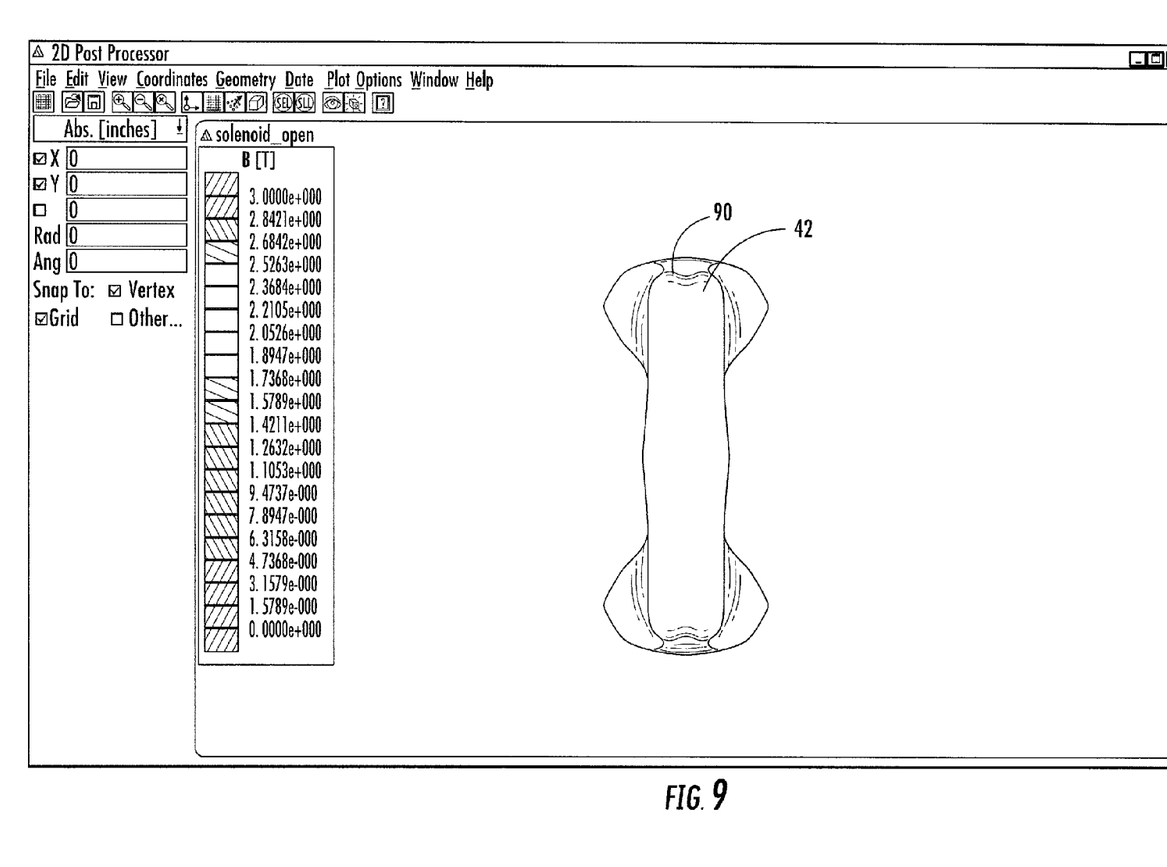
FIG. 9 is a graph of the flux leakage in a chamber lacking a steel cover and floor.
Figure 10:
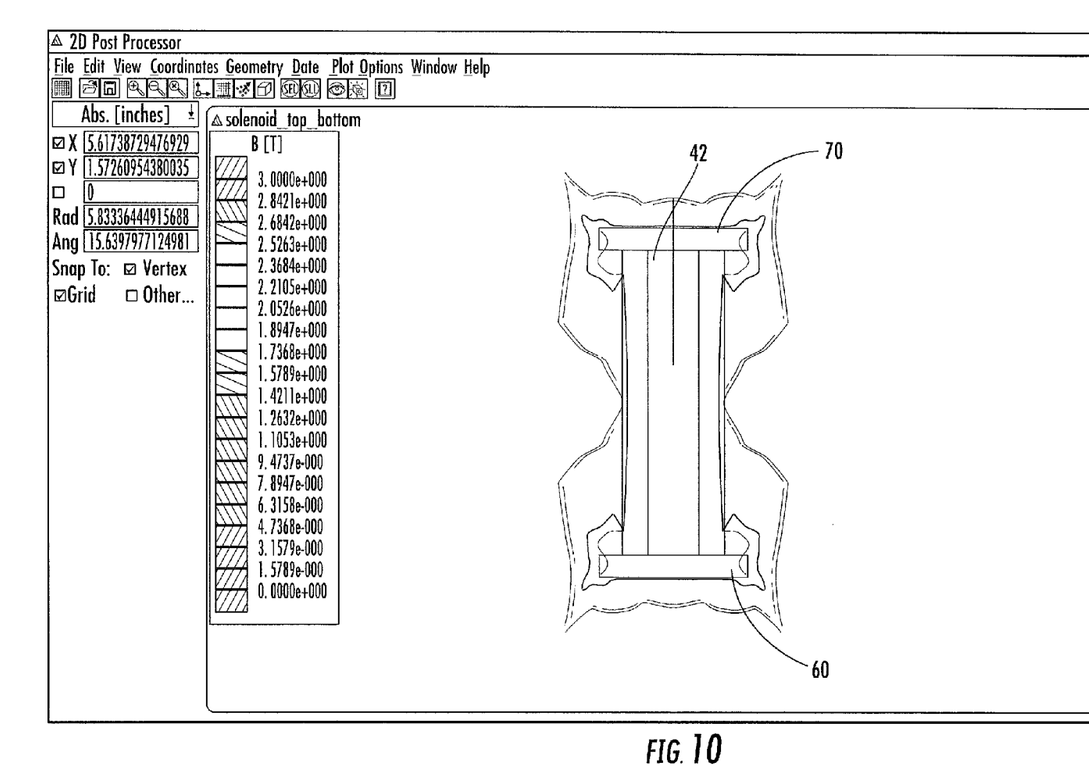
FIG. 10 is a graph of the flux containment in a chamber having a steel cover and floor.

Referring to FIG. 9, the chamber is designed as such so as to eliminate leakage of the magnetic forces wherein the top cover and bottom floor are preferably constructed of a steel plate so as to cause reflection of the magnetic forces released by the capacitors within the chamber creating a reflective chamber which reduces or eliminates leakage and focuses the discharge of current into the magnetic media for degaussing. The chamber 42, when used without a steel cover 70 and floor plate 60, shows leakage of the magnetic field 90 outside the chamber. The use of a steel plate cover 70 and floor plate 60, as shown in FIG. 10, provides a 38% improvement in flux strength and the field is strengthened by use of the reflective interior.

In operation, the degaussing of magnetic media takes place by placing an object containing magnetic media with a chamber having a front wall, a back wall, and two opposing side walls, said chamber having a coil capable of generating magnetic forces greater than 2000 A positioned around the exterior of said chamber; activating a first spring loaded solenoid coupled to a floor for positioning the floor beneath said chamber for sealing a bottom opening and supporting of the magnetic media placed within said chamber; activating a second spring loaded solenoid coupled to a cover for covering the top of said chamber with said cover for sealing magnetic media placed within said chamber; charging a capacitor bank capable of storing energy; discharging said stored energy from said capacitor bank into a first side of said coil for degaussing magnetic media placed with the chamber; recharging the capacitor band capable of storing energy; discharging said stored energy from said capacitor bank into a second side of said coil; deactivating said first spring loaded solenoid, said spring retracting said floor allowing the magnetic media to be removed from the chamber; and deactivating said second spring loaded solenoid, said spring retracting said cover allowing magnetic media to be placed into the chamber.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A bi-directional degaussing apparatus comprising:
   a bobbin having a front wall, a back wall, and two opposing side walls defining an interior chamber and an exterior continuous wall, said interior chamber having an upper opening and a lower opening;
   a coil capable of generating magnetic forces greater than 2000 A positioned around said exterior of said bobbin and shielded to cause the magnetic forces to be directed into said interior chamber;
   a movable floor for sealing said bottom opening, said floor positionable beneath said lower opening to support magnetic media placed within said chamber;
   a movable cover for sealing said upper opening, said cover positionable over said upper opening to seal magnetic media placed within said chamber;
   a capacitor bank for storing energy, said capacitor bank electrically coupled to said coil;
   a gate controller for generating a bi-directional release of stored energy from said capacitor bank to said coil, said coil providing a degaussing current to said interior chamber.

2. The bi-directional degaussing apparatus according to claim 1 wherein said movable floor is constructed of plate steel to prevent an escape of magnetic forces from said interior chamber.

3. The bi-directional degaussing apparatus according to claim 1 wherein said movable floor is coupled to a first spring loaded solenoid valve, said first spring loaded solenoid valve is engaged to position said movable floor beneath said bottom opening for containment of magnetic media to be degaussed and when said first spring loaded solenoid valve is disengaged, the spring retracts the floor to open allowing removal by gravity of magnetic media from said chamber.

4. The bi-directional degaussing apparatus according to claim 1 wherein said movable cover is coupled to a second spring loaded solenoid valve, said second spring loaded solenoid valve is engaged to position said movable cover over said upper opening for containment of magnetic media to be degaussed and when said second spring loaded solenoid valve is disengaged, the spring retracts the cover allowing insertion of magnetic media into said chamber.

5. The bi-directional degaussing apparatus according to claim 1 wherein said gate controller is further defined as a silicon control rectifier for sequentially generating a full strength flux field in opposite directions within said chamber.

6. The bi-directional degaussing apparatus according to claim 1 wherein capacitor bank is charged to a full voltage of about 400 VDC.

7. The bi-directional degaussing apparatus according to claim 1 wherein capacitor bank is charged from a near constant current charge circuit having a plurality of resistor switches sequenced by a control to maintain a charging current as close to the maximum current allowed by the capacitors.

8. A method of degaussing magnetic media comprising:
   placing an object containing magnetic media with a chamber having a front wall, a back wall, and two opposing side walls, said chamber having a coil capable of generating magnetic forces greater than 2000 A positioned around the exterior of said chamber;
   activating a first spring loaded solenoid coupled to a floor for positioning the floor beneath said chamber for sealing a bottom opening and supporting of the magnetic media placed within said chamber;

activating a second spring loaded solenoid coupled to a cover for covering the top of said chamber with said cover for sealing magnetic media placed within said chamber;

charging a capacitor bank capable of storing energy;

discharging said stored energy from said capacitor bank into a first side of said coil for degaussing magnetic media placed within the chamber;

recharging the capacitor band capable of storing energy;

discharging said stored energy from said capacitor bank into a second side of said coil;

deactivating said first spring loaded solenoid, said spring retracting said floor allowing the magnetic media to be removed from the chamber;

deactivating said second spring loaded solenoid, said spring retracting said cover allowing magnetic media to be placed into the chamber.

9. The method of degaussing magnetic media according to claim 8 wherein said capacitor bank is charged to a full voltage of about 400 VDC.

10. The method of degaussing according to claim 8 including the step of providing a near constant current charge circuit to maintain a charging current as close to the maximum current allowed by the capacitors.

* * * * *